(12) United States Patent
Ahn et al.

(10) Patent No.: US 12,047,619 B2
(45) Date of Patent: Jul. 23, 2024

(54) VIDEO PROCESSING METHOD OF IMAGE QUALITY COMPENSATION

(71) Applicants: Sang Ho Ahn, Yongin-si (KR); Kyu Mock Jung, Seongnam-si (KR)

(72) Inventors: Sang Ho Ahn, Yongin-si (KR); Kyu Mock Jung, Seongnam-si (KR)

(73) Assignee: KORDIO INC., Seongnam-si (KR)

( * ) Notice: Subject to any disclaimer, the term of this patent is extended or adjusted under 35 U.S.C. 154(b) by 61 days.

(21) Appl. No.: 18/106,630

(22) Filed: Feb. 7, 2023

(65) Prior Publication Data

US 2023/0262274 A1    Aug. 17, 2023

(30) Foreign Application Priority Data

Feb. 17, 2022  (KR) .................. 10-2022-0020493

(51) Int. Cl.
| | |
|---|---|
| *H04N 21/23* | (2011.01) |
| *H04N 19/109* | (2014.01) |
| *H04N 19/139* | (2014.01) |
| *H04N 19/172* | (2014.01) |
| *H04N 19/40* | (2014.01) |
| *H04N 21/2343* | (2011.01) |
| *H04N 21/2662* | (2011.01) |

(52) U.S. Cl.
CPC ... *H04N 21/234309* (2013.01); *H04N 19/109* (2014.11); *H04N 19/139* (2014.11); *H04N 19/172* (2014.11); *H04N 19/40* (2014.11); *H04N 21/2662* (2013.01)

(58) Field of Classification Search
CPC .............................................. H04N 21/234309
USPC ...................................................... 375/240.16
See application file for complete search history.

(56) References Cited

U.S. PATENT DOCUMENTS

| | | | | |
|---|---|---|---|---|
| 2006/0050785 | A1* | 3/2006 | Watanabe | H04N 19/12 |
| | | | | 348/E7.071 |
| 2014/0320740 | A1* | 10/2014 | Wan | H04N 21/00 |
| | | | | 375/240.26 |
| 2017/0048527 | A1* | 2/2017 | Syed | H04N 19/154 |
| 2023/0269395 | A1* | 8/2023 | Yang | G06T 7/11 |
| | | | | 375/240.21 |

FOREIGN PATENT DOCUMENTS

| | | |
|---|---|---|
| KR | 10-2009-0060875 A | 6/2009 |
| KR | 10-2013-0101900 A | 9/2013 |
| KR | 10-2313651 B | 10/2021 |

* cited by examiner

*Primary Examiner* — Yulin Sun
(74) *Attorney, Agent, or Firm* — Park Law Firm

(57) ABSTRACT

The present invention relates to a technique for effectively processing a large amount of video data which are generated by cameras (e.g., CCTV cameras). Particularly, the present invention relates to a video processing technique of image quality compensation, in which a compensation of image quality is periodically performed by high-resolution image switching when video streams of a plurality of resolution (e.g., 4K, 1K (Full-HD)) are provided from a camera, thereby maintaining storage capacity for storing videos at the level of low-resolution video and maintaining an object identification effect in video search at the level of high-resolution video.

5 Claims, 8 Drawing Sheets

VIDEO PROCESSING METHOD OF IMAGE QUALITY COMPENSATION

BACKGROUND OF THE INVENTION

Field of the Invention

The present invention relates to a technique for effectively processing a large amount of video data which are generated by cameras (e.g., CCTV cameras).

Particularly, the present invention relates to a video processing technique of image quality compensation, in which a compensation of image quality is periodically performed by high-resolution image switching when video streams of a plurality of resolution (e.g., 4K, 1K (Full-HD)) are provided from a camera, thereby maintaining storage capacity for storing videos at the level of low-resolution video and maintaining an object identification effect in video search at the level of high-resolution video.

Description of the Related Art

It is common to build a video control system using CCTV in order to prevent crime or secure ex post facto evidence. In a state where a number of CCTV cameras are installed, CCTV videos are displayed on a monitor and are stored in a storage device. When a control agent discovers a scene in which a crime or accident occurs, the control agent immediately handles the situation appropriately. When the occurrence of a crime or accident is later found out, the video in the storage is searched for evidence.

Recently used CCTV cameras have a function of simultaneously transmitting video streams of multiple resolutions. For example, CCTV cameras may provide both a high-resolution video stream and a low-resolution video stream for one scene. For example, the high-resolution may be 4K (3840×2160), and the low-resolution may be 1 K (1920×1080, Full-HD).

High-resolution (high-definition) videos are excellent in terms of object identification, but they have a problem in that a large amount of storage space is required to store videos. For example, a 4K video requires about four times a storage space compared with a Full-HD video. Due to the burden of storage capacity, it is common to store CCTV videos in low-resolution (low-definition) videos instead of high-resolution videos.

However, CCTV videos stored as such low-resolution videos have a problem in that the object identification effect is not sufficient in a post-video search process for securing evidence.

SUMMARY OF THE INVENTION

An object of the present invention is to provide a technique for effectively processing a large amount of video data generally generated by a camera (e.g., CCTV camera).

Particularly, an object of the present invention is to provide a video processing technique of image quality compensation, in which a compensation process of image quality is periodically performed through high-resolution image switching when video streams of a plurality of resolution (e.g., 4K, Full-HD) are provided from a camera, thereby maintaining storage capacity for storing videos at the level of low-resolution video and maintaining an object identification effect in video search at the level of high-resolution video.

In order to achieve the object, a video processing method of image quality compensation according to the present invention includes: receiving a dual stream video, wherein the dual stream video includes a high-resolution video stream and a low-resolution video stream; up-scaling the low-resolution video stream into an image-compensated stream of high-resolution; selecting a first I frame in the image-compensated stream; transcoding the first I frame into P frame; identifying one or more continuous first P frames in the image-compensated stream, wherein the first P frames follows right behind the first I frame; identifying a second I frame in the image-compensated stream, wherein the second I frame precedes the first I frame; transcoding the first P frames by inter-frame coding the first P frames with reference to the second I frame; selecting a third I frame in the image-compensated stream; identifying a fourth I frame in the high-resolution video stream, wherein the fourth I frame in the high-resolution video stream corresponds to the third I frame in the image-compensated stream; replacing the third I frame of the image-compensated stream with the fourth I frame; identifying a second P frame in the image-compensated stream, wherein the second P frame follows right behind the third I frame; transcoding the second P frame into I frame; identifying one or more continuous third P frames in the image-compensated stream, wherein the third P frames follows right behind the second P frame; and transcoding the third P frames by inter-frame coding the third P frames with reference to the transcoded second P frame.

The up-scaling may comprise re-compressing the low-resolution video stream into an image-compensated stream of high resolution with blurring the low-resolution video stream by linear interpolation.

The selecting a third I frame comprises selecting the third I frame in correspondence with a frame sequence section in which a moving object is identified on a basis of motion vector information, wherein the motion vector information is acquired by parsing the low-resolution video stream or the high-resolution video stream.

A computer program according to the present invention is stored in a nonvolatile storage medium to cause a computer to execute the video processing method of image quality compensation described above by being combined with hardware.

DESCRIPTION OF EMBODIMENTS

Hereinafter, the present invention will be described in detail with reference to the accompanying drawings.

Figure 1:
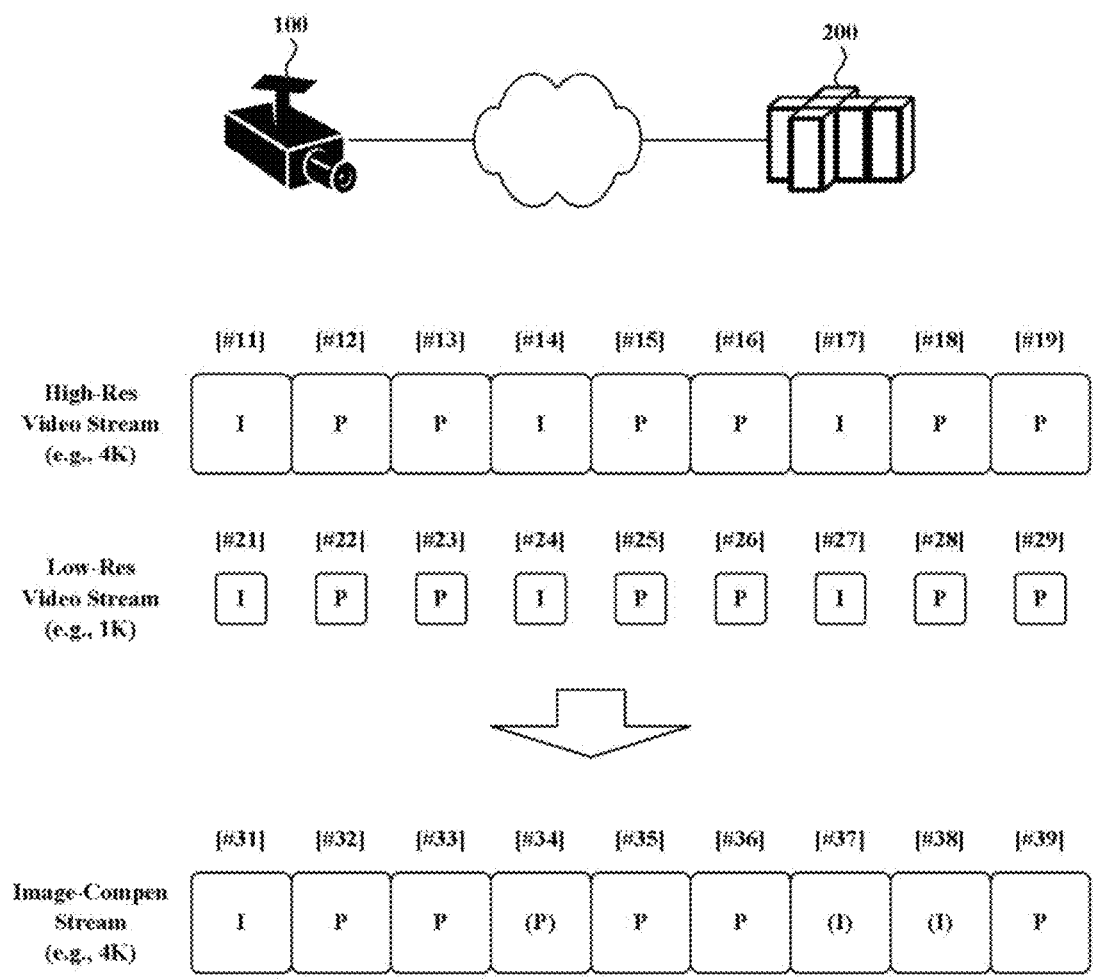
FIG. 1 is a diagram illustrating a dual stream video.

FIG. 1 is a diagram illustrating a concept in which a CCTV camera 100 generates a dual stream video.

In the present invention, the CCTV camera 100 may simultaneously send out video streams with a plurality of resolution as a result of taking a video of one object. Referring to FIG. 1, the CCTV camera 100 simultaneously sends out high-resolution (4K) video streams #11 to #19 and low-resolution (Full-HD) video streams #21 to #29. These two video streams have substantially the same content except for difference in image quality.

Meanwhile, in the present specification, the high-resolution video and the low-resolution video are used as relative concepts in a dual stream video. In the present specification, as an example, a 4K resolution video is used as a high-resolution video, and a Full-HD resolution video is used as the low-resolution video. In addition, for convenience of understanding, a Full-HD image (1920×1080) is illustrated in ¼ size of a 4K image (3840×2160).

The dual stream video generated by the CCTV camera 100 is transferred to a video processing apparatus 200. The video processing apparatus 200 performs, on the dual stream video, a video processing of image quality compensation according to the present invention.

Meanwhile, the video processing apparatus 200 may be implemented in various forms as technical means for electronically processing a dual stream video. For example, the video processing apparatus 200 may be implemented in a form of a video processing server, and may be implemented in a form of a user terminal. In addition, the video processing apparatus 200 may be implemented in a form of a smartphone application, and may be implemented in a form of an electronic circuit installed in the CCTV camera 100.

Figure 2:
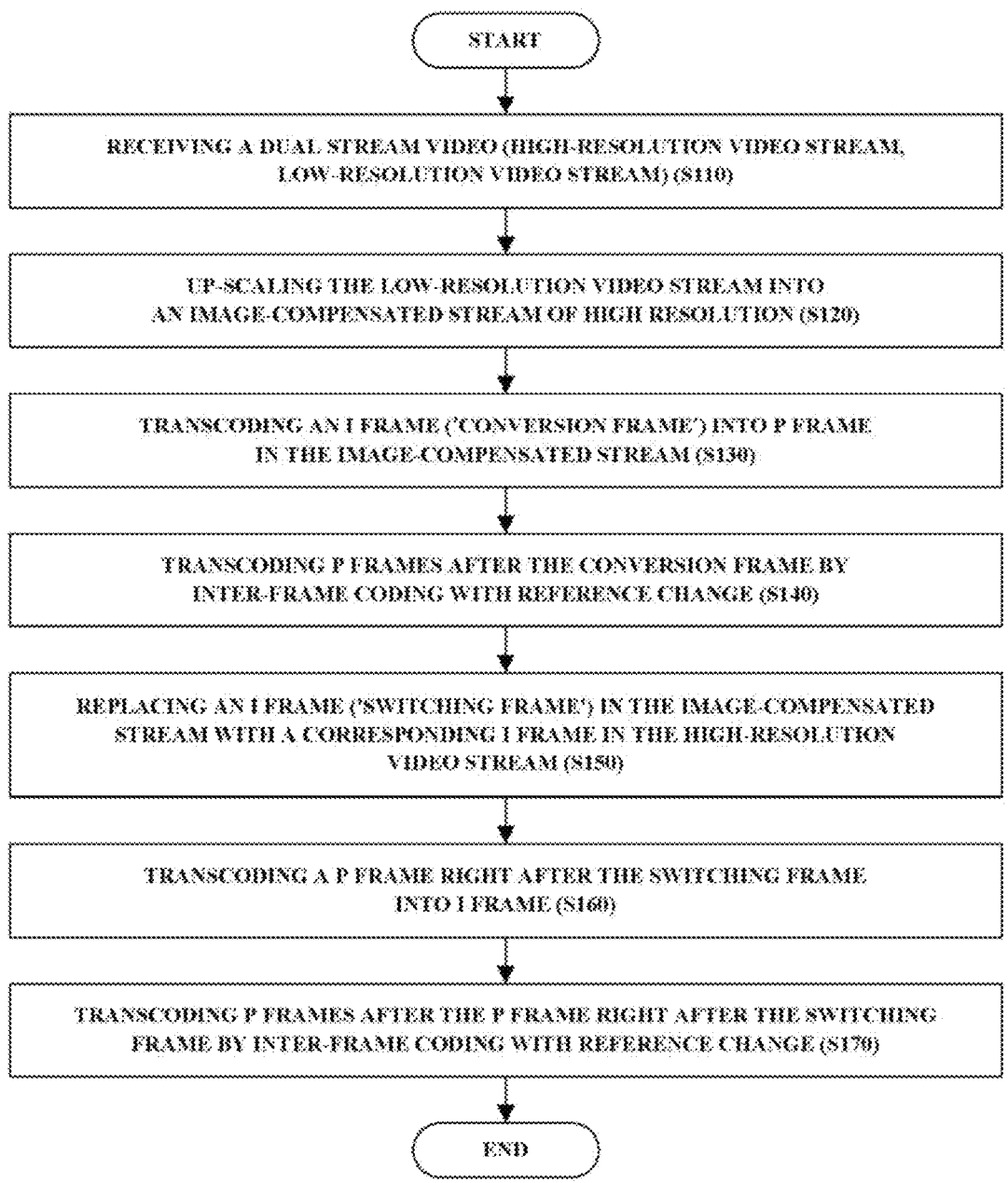
FIG. 2 is a flowchart illustrating a video processing method of image quality compensation according to the present invention.

FIG. 2 is a diagram illustrating an overall process in which the video processing apparatus 200 performs a video processing method of image quality compensation according to the present invention.

(S110): First, as described above referring to FIG. 1, the video processing apparatus 200 receives a dual stream video. The dual stream video includes a high-resolution (e.g., 4K) video stream #11 to #19 and a low-resolution (e.g., 1K, Full-HD) video stream #21 to #29.

Figure 3:
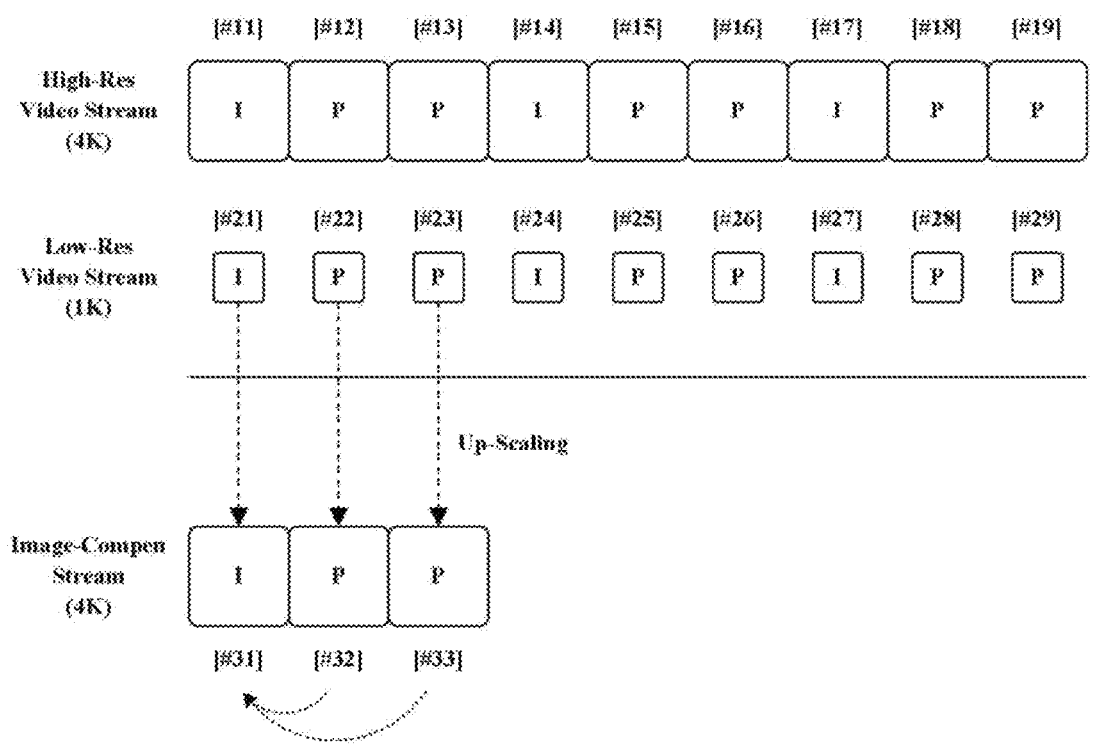
FIG. 3 is a diagram illustrating an up-scaling of a low-resolution video stream.

(S120): The video processing apparatus 200 obtains image-compensated streams #31 to #39 by up-scaling the low-resolution video streams #21 to #29 to high resolution (e.g., 4K). FIG. 3 illustrates the up-scaling low-resolution (Full-HD) video frames #21 to #23 so as to obtain high-resolution (4K) image-compensated streams #31 to #33 of high resolution.

In this case, it is preferable that the up-scaling is to perform a blurring process on the low-resolution video stream through linear interpolation of an average value between pixels, thereby being re-compressed to a high-resolution video. Generally, as for a video (low frequency component amplification) blurring-processed to high resolution (e.g., 4K) through simple up-scaling, image quality is not significantly improved as compared to the original video (e.g., Full-HD), and even if the compression rate is raised, the image quality does not deteriorate significantly. Accordingly, the image-compensated streams generated through the up-scaling in (S120) are seemingly 4K videos, but the image quality and compression rate thereof are maintained at the Full-HD level.

Meanwhile, in the present specification, the image-compensated streams are obtained by up-scaling the low-resolution video streams #21 to #29, and it is illustrated to have the same resolution (e.g., 4K) as the high-resolution video streams #11 to #19. In this case, since it is possible to easily perform I frame switching in (S150) to be described later, it is proposed as a preferred embodiment. However, it may be implemented with resolution different from this, for example, resolution of 2K or 4K. In this case, there should be further provided a process of setting resolution of an I frame #17 brought from a high-resolution video stream with 2K or 8K when the I frame switching is performed in (S150).

Meanwhile, frame sequence information of obtaining the image-compensated streams #31 to #39 may be performed on the basis of a high-resolution video stream. In this case, in (S120), low-resolution (e.g., Full-HD) video streams #21 to #29 are decoded, then are up-scaled to high resolution (e.g., 4K), and are re-encoded.

Figure 4:
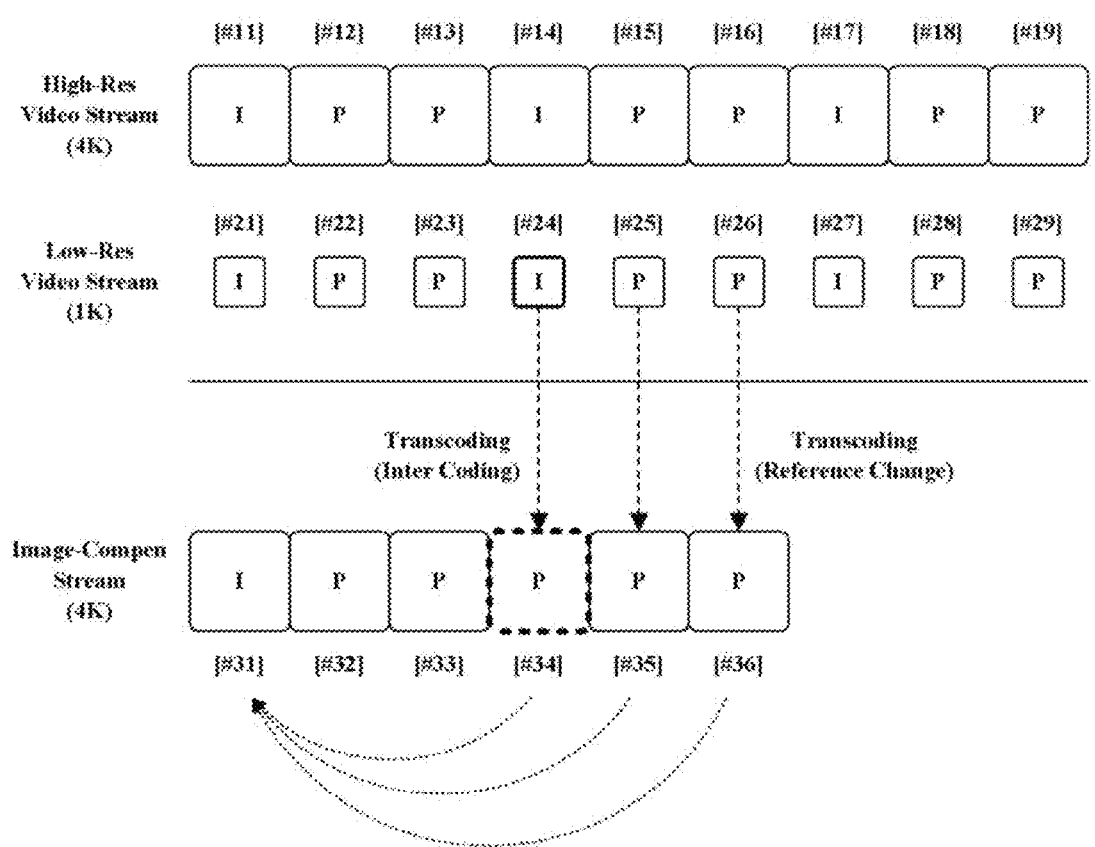
FIG. 4 is a diagram illustrating a transcoding of an I frame into a P frame.

(S130): The video processing apparatus 200 periodically transcodes an I frame (hereinafter, referred to as 'conversion frame') to a P frame in the image-compensated streams #31 to #39. FIG. 4 is a diagram illustrating a concept of periodically transcoding an I frame to a P frame. Referring to FIG. 4, in image-compensated streams #31 to #36, the frame #34 is a P frame and not an I frame. Since the frame #24 of the low-resolution video streams is the I frame, the frame #34 should also be the I frame when only the up-scaling was simply performed. However, in (S130), the frame #34 is transcoded from the I frame to the P frame.

This is to compensate for difference in compression rate between the high-resolution (4K) video and the low-resolution (Full-HD) video. In other words, when an image-compensated stream is obtained by up-scaling the low-resolution (e.g., Full-HD) video stream to high resolution (e.g., 4K) in (S120), the amount of data tends to somewhat increase compared to the low-resolution video stream. To compensate for this data increment, I-frames are periodically transcoded to P-frames. Since the I frame is intra-frame coding and the P frame is inter-frame coding, it is possible to reduce the amount of data by one tenths when the I frame is switched to the P frame. The data increase by the up-scaling (S120) is offset through the periodic I-to-P transcoding (S130). In FIG. 4, although the I-to-P transcoding is illustrated only for one frame #34, such a process may be periodically performed.

For convenience of description, in the image-compensated streams #31 to #39, the frame image subjected to the I-to-P transcoding by (S130) is referred to as 'conversion frame'.

(S140): The video processing apparatus 200 performs transcoding of changing a reference frame to an I frame before the conversion frame with respect to one or more continuous P frames #35 and #36 after the conversion frame #34 in the image-compensated streams #31 to #39.

In the low-resolution video streams #21 to #29, the P frames #25 and #26 was subjected to inter-frame coding with reference to the previous I frame #24. Accordingly, if simple up-scaling is performed as in (S120), inter-frame coding should be performed on the P frames #35 and #36 of the image-compensated streams #31 to #39 with reference to the frame #34. However, since the frame #34 in the image-compensated stream is switched to the I frame, this is difficult. Accordingly, one or more continuous P frames #35 and #36 after the conversion frame #34 is subjected to inter-frame coding by changing the reference frame to the I frame before the conversion frame, that is, the frame #31.

(S150): The video processing apparatus 200 intermittently selects an I frame (hereinafter, referred to as 'switching frame') in the image-compensated streams #31 to #39, and switches it to an I frame corresponding thereto in the high-resolution video streams #11 to #19.

Figure 5:
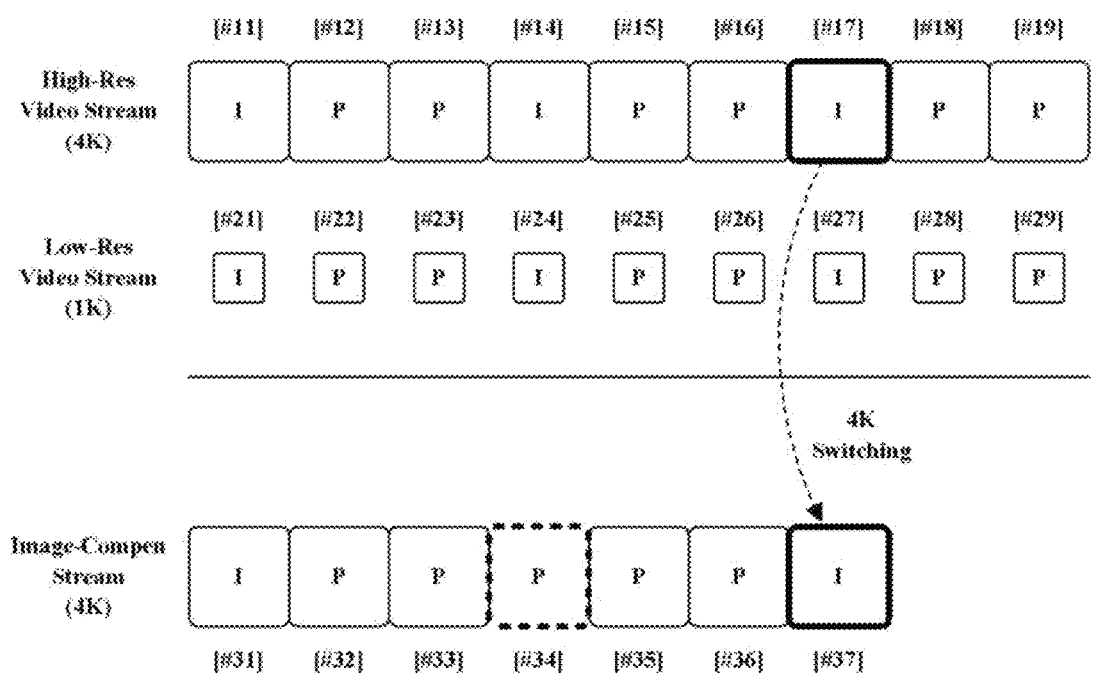
FIG. 5 is a diagram illustrating a concept of high-resolution switching.

FIG. 5 is a diagram illustrating periodic high-resolution switching according to the present invention. Referring to FIG. 5, an I frame #37 is selected as a switching frame in the image-compensated stream, and is switched to (replaced with) an I frame #17 corresponding thereto in a high-resolution video stream. From the point of view of the switching frame #37, a low-definition image obtained by up-scaling low resolution (Full-HD) has been changed to a high-definition original video that was originally high resolution (4K). In the image-compensated streams #31 to #39, such a switching frame is intermittently selected, thereby improving object identification performance of the image-compensated stream.

In this case, the selection of the switching frame may be implemented variously. For example, in an image-compensated stream, a switching frame may be selected periodically (e.g., once a second). Alternatively, motion vector information may be obtained through parsing about the low-resolution video stream or the high-resolution video stream, a frame sequence section in which a moving object is identified may be obtained therefrom, and then a switching frame may be selected in the frame sequence section. The technique of identifying a moving object section on the basis of bit stream parsing information may be implemented by, for example, Korean Patent Registration No. 10-2090775 "Method of extracting moving object area based on syntax information of compressed video".

Figure 6:
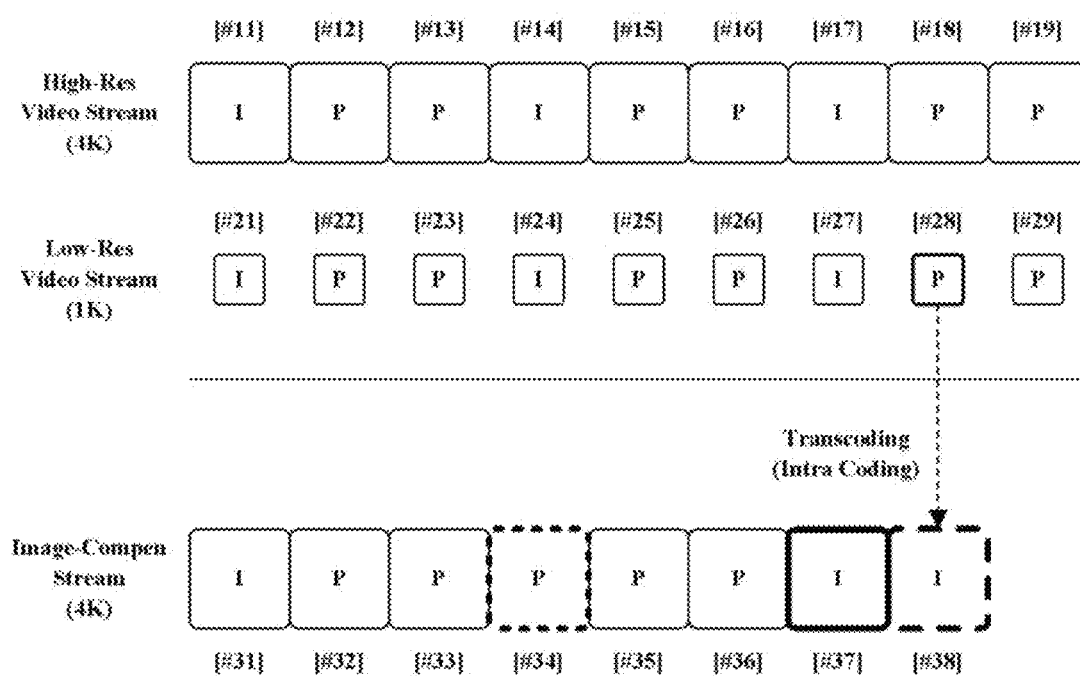
FIG. 6 is a diagram illustrating a transcoding of a P frame following right behind the high-resolution switching into an I frame.
Figure 7:
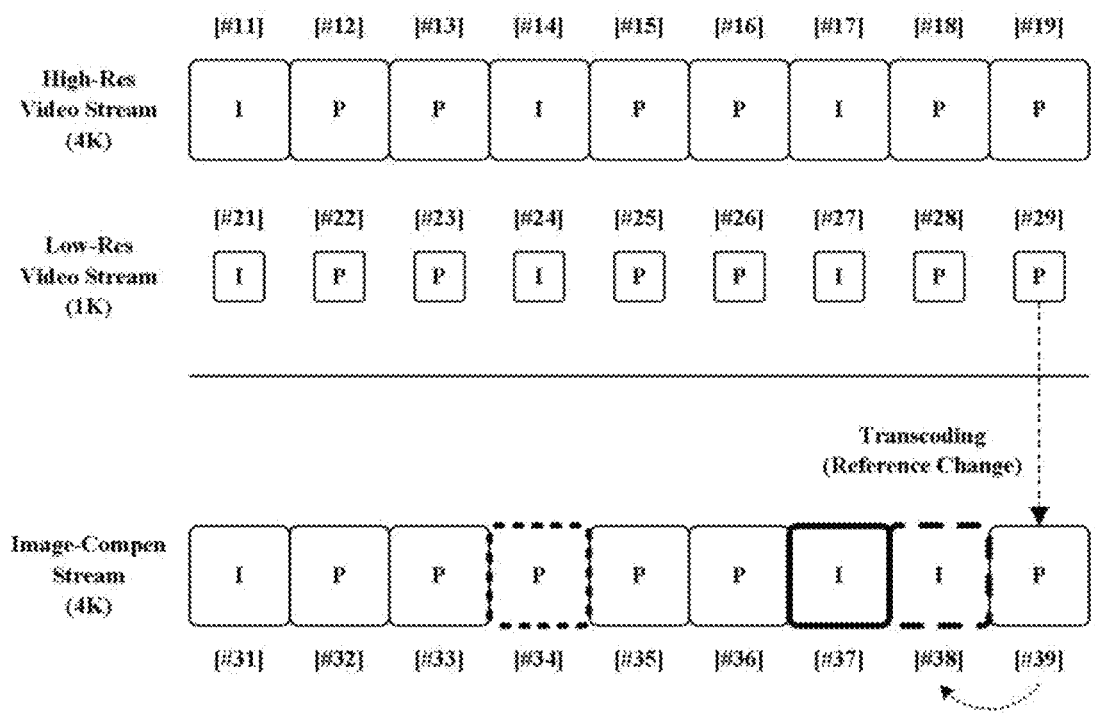
FIG. 7 is a diagram illustrating a post-processing after the transcoding a P frame following right behind the high-resolution switching.

(S160, S170): The video processing apparatus 200 transcodes a P frame #38 (hereinafter, referred to as 'frame-right-after-switching') following right behind a switching frame #37 to an I frame in the image-compensated streams #31 to #39, and performs transcoding of setting the frame-right-after-switching #38 as a reference frame with respect to one or more continuous P frame #39 coming after the frame-right-after-switching #38. FIG. 6 is a diagram illustrating a concept of transcoding the P frame #38 immediately after high-resolution switching to an I frame according to the present invention. FIG. 7 is a diagram illustrating a post-processing after transcoding the P frame #38 immediately after high-resolution switching to an I frame.

In (S150), the switching frame #37 was switched to the high-resolution original image. Accordingly, when the P frame #38 appearing thereafter is inter-frame-encoded to original with reference to the switching frame #37, a completely undesirable result may occur due to difference in quality between a 4K original image and a Full-HD up-scaling image. Accordingly, as illustrated in FIG. 6, the P frame following right behind the switching frame #37, that is, the frame-right-after-switching was originally the P frame but is transcoded to an I frame. Data increase due to the P-to-I transcoding for the frame #38 immediately after switching is offset by data decrease caused by the I-to-P transcoding for the switching frame #34 in (S130).

Then, as illustrated in FIG. 7, with respect to one or more continuous P frame #39 coming after the frame-right-after-switching #38, the frame-right-after-switching #38 (i.e., I frame) is set as a reference frame and transcoding of performing inter-frame coding is performed.

Figure 8:
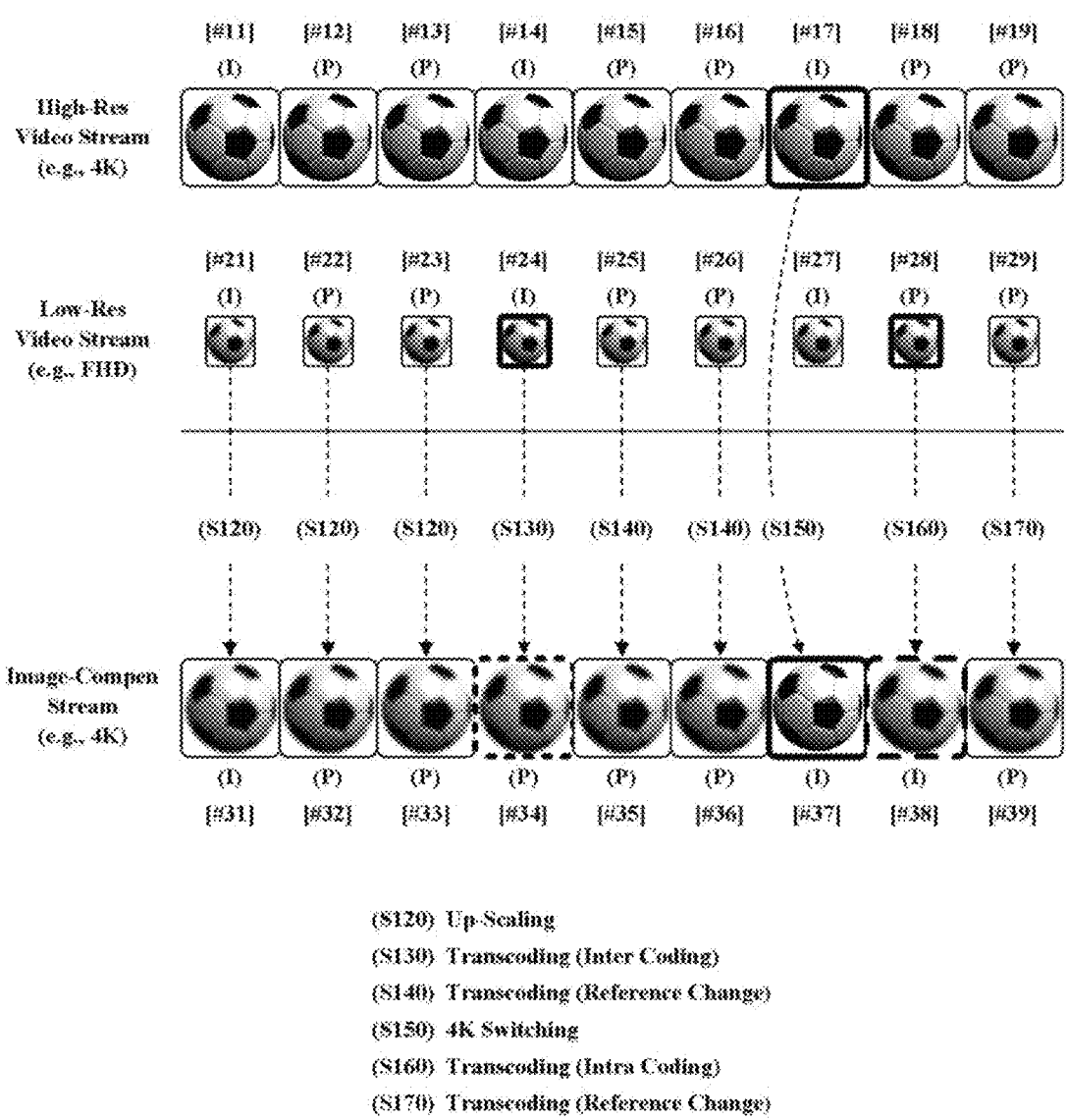
FIG. 8 is a diagram illustrating an example of video processing according to the present invention.

FIG. 8 is a diagram illustrating an example of performing a video processing of image quality compensation according to the present invention.

Referring to FIG. 8, high-resolution (4K) image-compensated streams #31 to #39 were acquired from high-resolution (4K) video streams #11 to #19 and low-resolution (Full-HD) video streams #21 to #29. As illustrated in the frame #37, since high-definition original images are included in the middle, an image-compensated stream may show good object identification performance. All or a part of the data increase due to the overall up-scaling for the video streams, the high-definition switching for the switching frame #37, and the I frame transcoding for the frame-right-after-switching #38 is offset by the I-to-P transcoding for the switching frame #34.

Meanwhile, the present invention may be implemented in a form of computer-readable codes on a nonvolatile recording medium. Various types of storage devices exist as such non-volatile recording media, for example, hard disk, SSD, CD-ROM, NAS, magnetic tape, web disk, cloud disk, and the like. In addition, the present invention may be coupled with hardware and be implemented in a form of a computer program stored in a medium to execute a specific procedure.

According to the present invention, there is an advantage that, when a large amount of video data is generated from a camera (e.g., CCTV camera), it is possible to provide good object identification performance at the level of high-resolution video in a video search process for crime prevention or crime evidence collection while keeping storage capacity required for storing videos low.

While the present invention has been described with respect to the specific embodiments, it will be apparent to those skilled in the art that various changes and modifications may be made without departing from the spirit and scope of the invention as defined in the following claims.

What is claimed is:

1. A video processing method of image quality compensation, comprising:
   receiving a dual stream video, wherein the dual stream video includes a high-resolution video stream and a low-resolution video stream;
   up-scaling the low-resolution video stream into an image-compensated stream of high-resolution;
   selecting a first I frame in the image-compensated stream;
   transcoding the first I frame into P frame;
   identifying one or more continuous first P frames in the image-compensated stream, wherein the first P frames follows right behind the first I frame;
   identifying a second I frame in the image-compensated stream, wherein the second I frame precedes the first I frame;
   transcoding the first P frames by inter-frame coding the first P frames with reference to the second I frame;
   selecting a third I frame in the image-compensated stream;
   identifying a fourth I frame in the high-resolution video stream, wherein the fourth I frame in the high-resolution video stream corresponds to the third I frame in the image-compensated stream;
   replacing the third I frame of the image-compensated stream with the fourth I frame;
   identifying a second P frame in the image-compensated stream, wherein the second P frame follows right behind the third I frame;
   transcoding the second P frame into I frame;
   identifying one or more continuous third P frames in the image-compensated stream, wherein the third P frames follows right behind the second P frame; and
   transcoding the third P frames by inter-frame coding the third P frames with reference to the transcoded second P frame.

2. The method of claim 1, wherein the up-scaling comprising:

re-compressing the low-resolution video stream into an image-compensated stream of high resolution with blurring the low-resolution video stream by linear interpolation.

3. The method of claim 1, wherein the selecting a third I frame comprising:
   selecting the third I frame in correspondence with a frame sequence section in which a moving object is identified on a basis of motion vector information, wherein the motion vector information is acquired by parsing the low-resolution video stream or the high-resolution video stream.

4. A non-transitory computer program contained in a non-transitory storage medium comprising program code instructions which execute a video processing method of image quality compensation, comprising:
   receiving a dual stream video, wherein the dual stream video includes a high-resolution video stream and a low-resolution video stream;
   up-scaling the low-resolution video stream into an image-compensated stream of high-resolution;
   selecting a first I frame in the image-compensated stream;
   transcoding the first I frame into P frame;
   identifying one or more continuous first P frames in the image-compensated stream, wherein the first P frames follows right behind the first I frame;
   identifying a second I frame in the image-compensated stream, wherein the second I frame precedes the first I frame;
   transcoding the first P frames by inter-frame coding the first P frames with reference to the second I frame;
   selecting a third I frame in the image-compensated stream;
   identifying a fourth I frame in the high-resolution video stream, wherein the fourth I frame in the high-resolution video stream corresponds to the third I frame in the image-compensated stream;
   replacing the third I frame of the image-compensated stream with the fourth I frame;
   identifying a second P frame in the image-compensated stream, wherein the second P frame follows right behind the third I frame;
   transcoding the second P frame into I frame;
   identifying one or more continuous third P frames in the image-compensated stream, wherein the third P frames follows right behind the second P frame; and
   transcoding the third P frames by inter-frame coding the third P frames with reference to the transcoded second P frame.

5. A non-transitory computer program contained in a non-transitory storage medium comprising program code instructions which execute a video processing method of image quality compensation, comprising:
   receiving a dual stream video, wherein the dual stream video includes a high-resolution video stream and a low-resolution video stream;
   up-scaling the low-resolution video stream into an image-compensated stream, wherein the up-scaling comprising re-compressing the low-resolution video stream into an image-compensated stream of high resolution with blurring the low-resolution video stream by linear interpolation;
   selecting a first I frame in the image-compensated stream;
   transcoding the first I frame into P frame;
   identifying one or more continuous first P frames in the image-compensated stream, wherein the first P frames follows right behind the first I frame;
   identifying a second I frame in the image-compensated stream, wherein the second I frame precedes the first I frame;
   transcoding the first P frames by inter-frame coding the first P frames with reference to the second I frame;
   selecting a third I frame in the image-compensated stream;
   identifying a fourth I frame in the high-resolution video stream, wherein the fourth I frame in the high-resolution video stream corresponds to the third I frame in the image-compensated stream;
   replacing the third I frame of the image-compensated stream with the fourth I frame;
   identifying a second P frame in the image-compensated stream, wherein the second P frame follows right behind the third I frame;
   transcoding the second P frame into I frame;
   identifying one or more continuous third P frames in the image-compensated stream, wherein the third P frames follows right behind the second P frame; and
   transcoding the third P frames by inter-frame coding the third P frames with reference to the transcoded second P frame.

\* \* \* \* \*